No. 878,587. PATENTED FEB. 11, 1908.
G. C. WIMPEE.
VEHICLE WHEEL.
APPLICATION FILED MAR. 18, 1907.

WITNESSES:

George C. Wimpee,
INVENTOR

By C. A. Snow & Co.
ATTORNEYS

UNITED STATES PATENT OFFICE.

GEORGE COLVIN WIMPEE, OF ROME, GEORGIA.

VEHICLE-WHEEL.

No. 878,587.

Specification of Letters Patent.

Patented Feb. 11, 1908.

Application filed March 18, 1907. Serial No. 363,056.

*To all whom it may concern:*

Be it known that I, GEORGE COLVIN WIMPEE, a citizen of the United States, residing at Rome, in the county of Floyd and State of Georgia, have invented a new and useful Vehicle-Wheel, of which the following is a specification.

This invention relates to vehicle wheels and its object is to provide a rim or felly formed in a single piece of metal and so shaped as to render the wheel light and durable.

A still further object is to provide means whereby the spokes can be securely fastened to the felly without danger of becoming detached or loose and without the necessity of weakening them. The wheel is more particularly designed for use with buggies and light vehicles although it is to be understood that the same can be adapted for use with any form of vehicle desired.

The invention consists of certain novel features of construction and combinations of parts which will be hereinafter more fully described and pointed out in the claims.

In the accompanying drawings is shown the preferred form of the invention.

Figure 1:
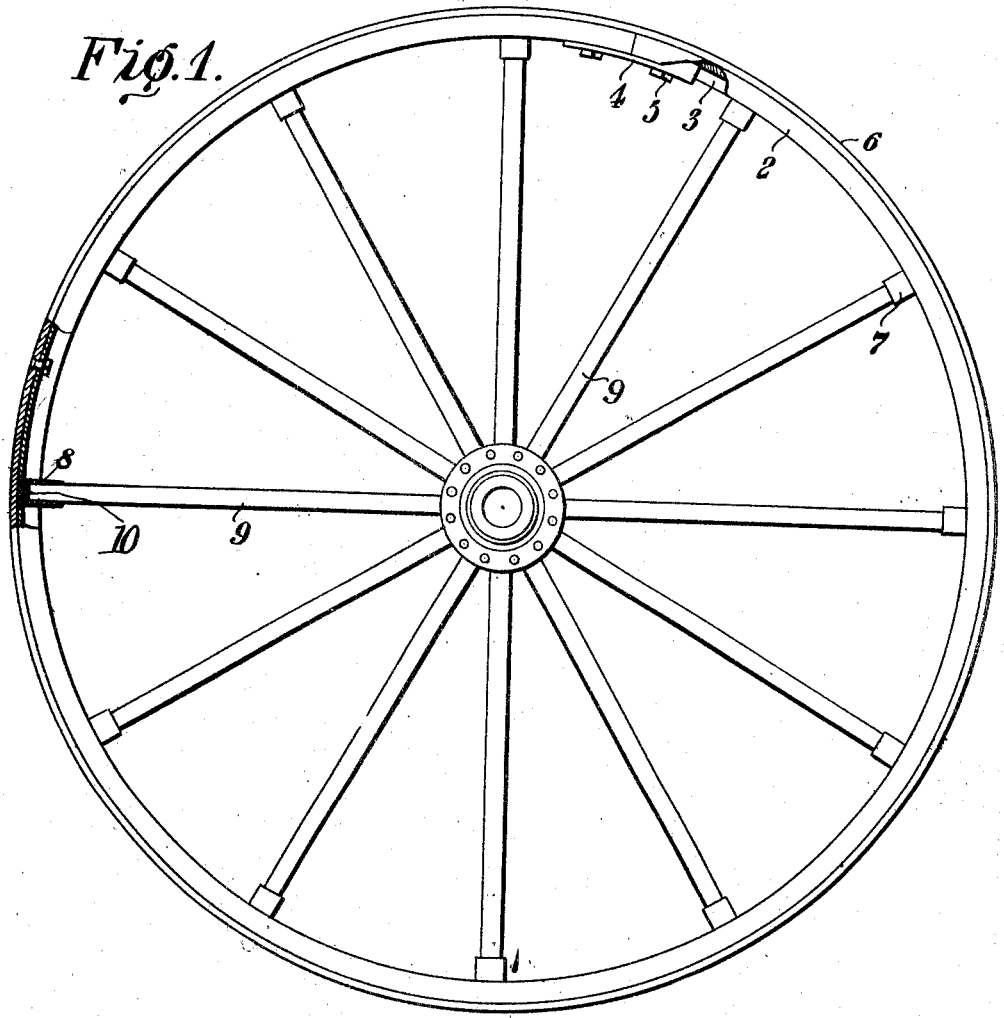
Figure 2:
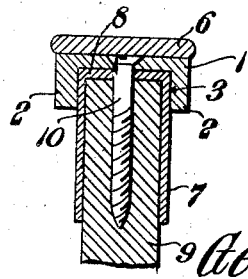

In said drawings: Figure 1 is an elevation of a wheel constructed in accordance with the present invention, portions of the felly being broken away; and Fig. 2 is an enlarged transverse section through the felly and the connection between it and a spoke.

Referring to the figures by characters of references, 1 is a rim or felly consisting of a single strip of metal having inwardly extending parallel flanges 2 forming an inner groove 3. The ends of the strip are fastened together by a coupling plate 4 which fits snugly within the end portion of the groove 3 and is fastened in place by means of bolts 5 which extend through the coupling plate and felly. Either a metal or a rubber tire 6 may be placed upon the felly. Arranged within the groove 3 at regular intervals are cylindrical sockets 7 having their bases closed as shown at 8 and the internal diameter of each of these sockets is sufficient to permit one end of a spoke 9 to project thereinto without the necessity of reducing the diameter of the spoke and therefore weakening it. Each socket is held in place preferably by a screw 10 which extends through the felly and the base of the socket and into the end of the spoke as shown particularly in Fig. 2. Displacement of the screw is prevented by the tire 6 and splitting of the spoke is prevented by the socket 7. A felly constructed in the manner herein described may be made lighter than an ordinary wooden felly but will be much more durable and will positively prevent dishing, such as frequently occurs particularly when a rubber tire is used upon the wheel. As the felly is formed in a single piece there are no parts likely to split or become separated. It is to be understood that the coupling plate 4 is placed almost entirely within the groove 3 and the bolts 5 are therefore relieved of all transverse strains to which they might otherwise be subjected.

What is claimed is:

1. A wheel having a metallic felly having a continuous groove in the inner face thereof, sockets having closed bases fitted within the grooves, a spoke seated within each socket, securing devices extending through the felly and into the spokes, and a tire upon the felly for retaining the securing devices therein.

2. A wheel having a felly consisting of a metal strip having abutting ends, inwardly extending parallel flanges integral with the strip and forming an inner groove or channel, a coupling plate secured within the end portions of the grooves for fastening the ends of the strip together, sockets within the grooves and having closed bases, spokes seated within the sockets, securing devices extending through the felly and the bases of the sockets and into the spokes, and a tire extending over said securing devices to prevent displacement thereof.

In testimony that I claim the foregoing as my own, I have hereto affixed my signature in the presence of two witnesses.

GEORGE COLVIN WIMPEE.

Witnesses:
HUGH McCRORY,
J. A. JENKINS.